United States Patent [19]

Kimura

[11] Patent Number: 4,872,350

[45] Date of Patent: Oct. 10, 1989

[54] MECHANICAL QUANTITY SENSOR ELEMENT

[75] Inventor: Naomasa Kimura, Saitama, Japan

[73] Assignee: Honda Giken Kogyo Kabushiki Kaisha, Tokyo, Japan

[21] Appl. No.: 160,742

[22] Filed: Feb. 26, 1988

[30] Foreign Application Priority Data

Feb. 27, 1987 [JP] Japan .................................. 62-43164

[51] Int. Cl.$^4$ ............................................. H01F 1/00
[52] U.S. Cl. .................................. 73/779; 73/DIG. 2; 73/862.69; 73/862.36; 148/120
[58] Field of Search ..................... 148/120; 73/862.36, 73/862.69, 779, DIG. 2, 862.39; 324/209; 336/218

[56] References Cited

U.S. PATENT DOCUMENTS

| | | | |
|---|---|---|---|
| 4,053,331 | 10/1977 | Graham, Jr. et al. .............. | 148/120 |
| 4,284,441 | 8/1981 | Satoh et al. .......................... | 148/120 |
| 4,288,260 | 9/1981 | Senno et al. ......................... | 148/120 |
| 4,590,807 | 5/1986 | Kobayashi et al. ............. | 73/862.36 |

Primary Examiner—Joseph A. Orsino
Assistant Examiner—Hollis T. Chen
Attorney, Agent, or Firm—Lyon & Lyon

[57] ABSTRACT

A mechanical quantity sensor element making use of stress-magneto effect of noncrystalline magnetic alloy. Compression strain is preliminarily given to a thin belt made of noncrystalline magnetic alloy by carrying out treatment of applying an external force onto a surface of the thin belt. Suitable methods for applying the external force include; surface grinding by means of abrasive cloth or paper, shot-peening in which spherical fine grains are impinged onto a surface of a thin belt, stroking work in which a surface of a thin belt is scrubbed by means of a scrubber piece made of synthetic resin, rubber or other material, and the like.

5 Claims, 6 Drawing Sheets

MECHANICAL QUANTITY SENSOR ELEMENT

BACKGROUND OF THE INVENTION:

The present invention relates to a mechanical quantity sensor element making use of a stress-magneto effect of noncrystalline magnetic alloys (amorphous magnetic alloys).

Among the mechanical quantity sensors for measuring a force, a torque or the like, a sensor making use of a stress-magneto effect of noncrystalline magnetic alloys has been marketed in recent years. This type of mechanical quantity sensor affords the advantages that (1) non-contact sensing of a force is possible, (2) conversion of a force into an electrical quantity can be achieved directly, (3) a device structure of the sensor is simple and hence reduction in size thereof can be realized, and (4) noncrystalline magnetic alloys are materials having a high strength and a high stiffness, which are perfect elastic materials and exhibit excellent corrosion resistance, and therefore, are excellent in resisting environmental conditions and withstanding a wide scope of working conditions.

By way of example, as shown in FIG. 1, there is known a torque sensor in which a thin belt (ribbon) 01 made of noncrystalline magnetic alloy having positive magneto-striction, that is sensitive in a stress-magneto effect, is wrapped around a rotary shaft 02 so that "torsion strain" generated in the rotary shaft 02 by a torque T may be introduced into the thin belt 01, change of magnetic characteristics of the thin belt 01 caused by the stress-magneto effect is sensed, and thereby the torque T can be sensed. In noncrystalline magnetic alloy having positive magnetostriction, there occurs a phenomenon that if a tensile stress is applied to that alloy, magneto-elastic energy in the direction of the tensile stress is lowered and in that direction magnetization becomes easy. This phenomenon is called stress-magneto effect. In the above-mentioned torque sensor, a uniform easy magnetization axis (uniaxial magnetic anisotropy) Ku in the direction making an inclination angle $\alpha(\alpha>45°)$ with respect to the circumferential direction 03 is given to the entire surface of the thin belt 01 by making use of this stress-magneto effect. However, if a torque T is exerted upon the rotary shaft 02, then as shown in FIG. 2, a stress $\alpha$ represented by the equation of $$\sigma = \frac{16}{\pi d^3} \cdot T$$

(where d represents an outer diameter of the rotary shaft 02) is generated in the direction making an angle of ±45° with respect to the axial direction of the rotary shaft 02, hence uniaxial magnetic anisotropy is induced also in the direction of +$\sigma$ due to the stress-magneto effect, and as a result, a combined easy magnetization axis Ku' is given.

Now, on the basis of the fact that generally a magnetic permeability of a magnetic body would vary depending upon a direction of an easy magnetization axis relative to a direction of a magnetic field, the above-mentioned change of the easy magnetization axis (Ku→Ku') is acknowledged as a variation of a magnetic permeability, and thereby a magnitude of the torque T can be detected.

Therefore, if the variation of the magnetic permeability (or a magnetic flux density) is detected as a voltage variation, for example, by means of a magnetizing coil (primary coil) and a detecting coil (secondary coil), a torque-output curve as shown in FIG. 3 can be obtained.

However, n the case of the normally used noncrystalline magnetic alloy, since a linearity of the torque-output curve is poor and a detectable range I for the mechanical quantity is narrow, the sensor element is limited to utilization as a sensor element in a low torque range. Also, since a stress-output curve of the noncrystalline magnetic alloy has a large gradient in the proximity of stress=0 as shown in FIG. 4, a sensitivity at that portion is very high. Therefore, in combination with the fact that the stress distribution produced in the thin belt 01 by uneven bonding forces upon bonding the thin belt 01 onto the surface of the rotary shaft 02 (as shown in FIG. 1) is not uniform, in the case where the torque exerted upon the rotary shaft 02 is zero, the sensor output which should be inherently zero, would be detected as a relatively large value because of difference in the stopping angle of the rotary shaft 02.

In addition, in the case of producing a thin belt of noncrystalline magnetic alloy through a liquid super-quenching process, as it is impossible to perform quenching under a uniform cooling condition over the entire surface of the thin belt or under an always uniform cooling condition, generation of non-uniform residual stress is inevitable. So when a plurality of obtained thin belts are used as mechanical quantity sensor elements, a disadvantage is associated that "distribution" of magnetic characteristics caused by difference of residual stress would be generated.

SUMMARY OF THE INVENTION:

The present invention is a mechanical quantity sensing element and method. The mechanical quantity sensor element has a noncrystalline magnetic alloy in the form of a thin belt with a preliminarily applied compression strain applied by an external force.

One object of the present invention is to provide a mechanical quantity sensor element having a stress-magneto characteristic curve with excellent linearity, a variation of a mechanical quantity which can be detected over a wide range, and a generous gradient of the same characteristic curve in the proximity of stress=0.

Another object of the present invention is to provide a mechanical quantity sensor element in which "distribution" of magnetic characteristics of the same sensor element is reduced.

For example, in the case of noncrystalline magnetic alloy provided in the form of a thin belt through the steps of continuously feeding molten alloy onto a copper drum that is rotating at a high speed and then very quickly quenching the alloy, crystal grain boundaries are not present in its texture, it is a ferromagnetic material that is mechanically, chemically and electro-magnetically superior as compared to the crystalline alloys in the prior art, and especially since the noncrystalline magnetic alloy contains iron as a principal component, it offers an excellent linearity in the stress-magneto characteristics.

Now, since the above-described noncrystalline magnetic alloy is a material obtained by freezing a liquid structure, an atom distribution state thereof is similar to a liquid phase state, it has a low density as compared to a crystalline material (crystalline alloy), and hence an interatomic attraction is surmised to be large as compared to a crystalline material. According to this surmise, the value zero of stress on the characteristic curve a shown in FIG. 4 is a virtual value, and one can imagine that a curve b continuous to the characteristic curve a is latent, for example, as shown in FIG. 5. Hence, if it is possible to bring this portion of the latent curve b to the range of stress>0 and thus obtain a characteristic curve c shown in FIG. 6, then the stress-magneto characteristics can be remarkably improved.

The inventor of this invention conducted experiments under the above-mentioned surmise, and as a result it was confirmed that by preliminarily giving compression strain (compression stress) to a noncrystalline magnetic alloy piece having positive magnetostriction, the above-described characteristic curve c can be realized.

With regard to the method for giving compression strain, one may conceive (1) a method of applying a paint film on a surface of a thin belt made of noncrystalline magnetic alloy and making use of a difference in a thermal expansion characteristic between the thin belt and the paint film, (2) a method of sticking a thin belt onto a surface of an object for detection of a mechanical quantity by means of an adhesive and making use of a difference in a thermal expansion characteristic between the thin belt and the adhesive, or (3) a method of applying metal plating onto a surface of a thin belt and making use of an internal stress produced in the coated film.

According to the present invention, it is proposed that working is effected in that an external force is directly applied to a surface of a thin belt without making use of a bonding relation to another material as described above and thereby compression strain is preliminarily given to a thin belt. With regard to the method of applying an external force, one can enumerate a surface grinding method by means of abrasive cloth or paper, a shot-peening method in which spherical fine grains are impinged onto a surface of a thin belt, a "stroking work method" in which a surface of a thin belt is scrubbed by means of a scrubber piece made of synthetic resin, rubber or other material, and the like. The amount of the compression strain given to a thin belt is regulated by varying the extent of application of an external force through these working methods, and thereby the above-mentioned objects of the present invention can be achieved. It is to be noted that with respect to the surface grinding by means of abrasive cloth or paper, grinding to such extent that a surface of a thin belt is stroked once or twice can suffice, and in the case of a thin belt having a film thickness of about 25 μm, the amount to be ground should be suppressed to 2~3 μm or less. Also, the grain size of the abrasive cloth or paper is properly selected at #320 (coarse)~#1000(-fine).

DETAILED DESCRIPTION OF PREFERRED EMBODIMENTS:

Test EXAMPLE 1.

(1) A plurality of thin belts of $Fe_{81}B_{13.5}Si_{3.5}C_2$ (dimensions: 25 μm in thickness, 10 cm in length and 25 mm in width) produced through a single roll process (a liquid super-quenching process) were prepared.

(2) One surface of the thin belts was ground by means of abrasive cloth or paper having a grain size of #800~1000. The amount of grinding (a thickness removed by grinding) was in the range 0~0.06 μm, and the amount was varied for each thin belt.

Figure 7:
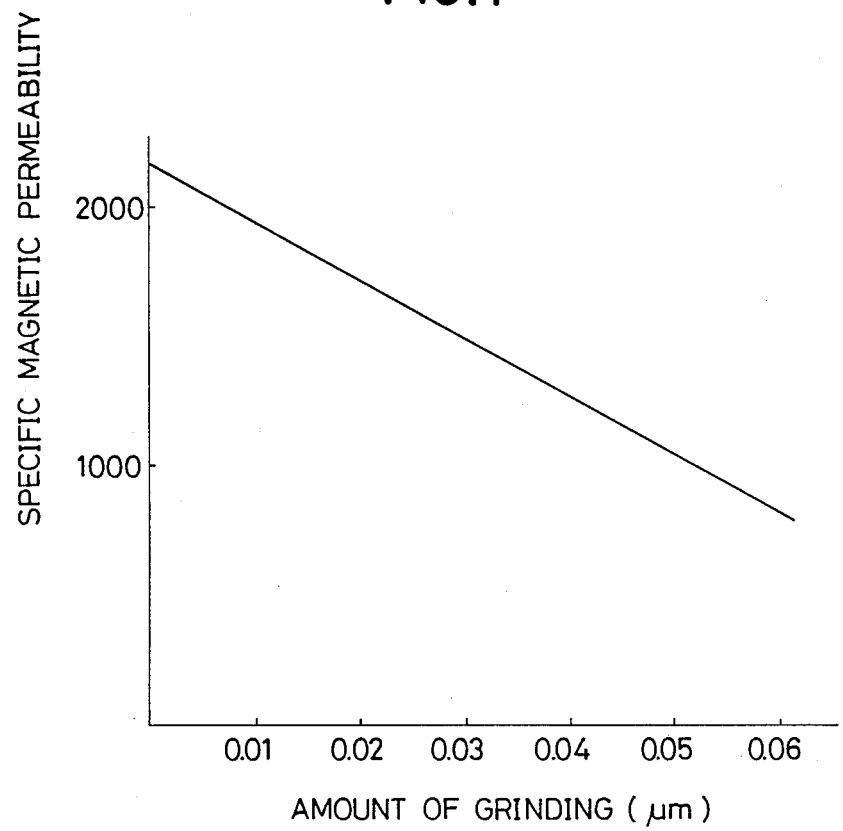
FIG. 7 is a graph showing a relation between an amount of surface grinding of a thin belt made of noncrystalline magnetic alloy and, a specific magnetic permeability thereof.

(3) When the specific magnetic permeabilities of the respective thin belts subjected to different amounts of grinding were checked under a condition not applied with an external force, the result shown in FIG. 7 was obtained.

<Evaluation of the Test Result>

(1) From FIG. 7 it is seen that as an amount of grinding is increased, a specific magnetic permeability is linearly decreased. This implies that a magnetic permeability of a thin film can be regulated by varying an amount of grinding, and obviously "distribution" of magnetic characteristics among the thin belts can be reduced.

Figure 1:
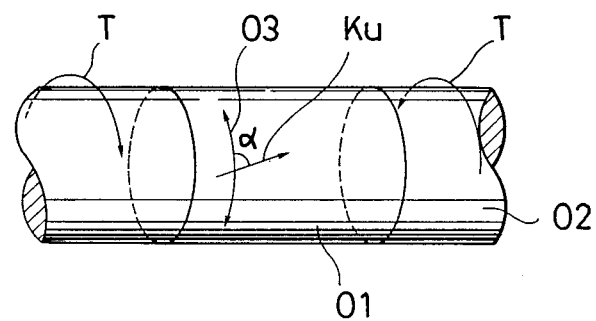
FIG. 1 and 2, are schematic views for explaining a principle in the case of detecting a torque applied to a shaft by bonding a noncrystalline magnetic alloy piece to the circumference of the shaft.
Figure 2:
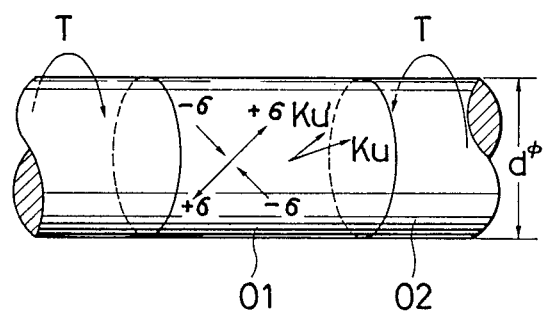
Figure 3:
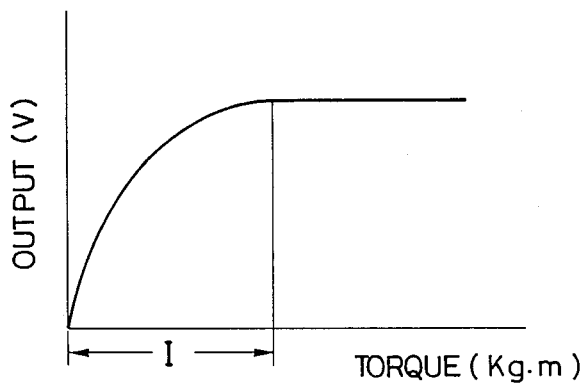
FIG. 3 is a graph showing a torque-output curve as one example of measurement for a shaft torque by means of a torque sensor making use of a thin plate made of noncrystalline magnetic alloy.
Figure 4:
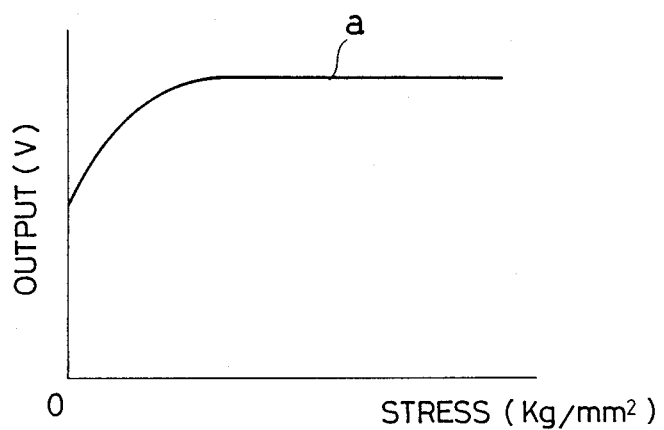
FIG. 4 is a graph showing a stress-magneto characteristic of noncrystalline magnetic alloy.
Figure 5:
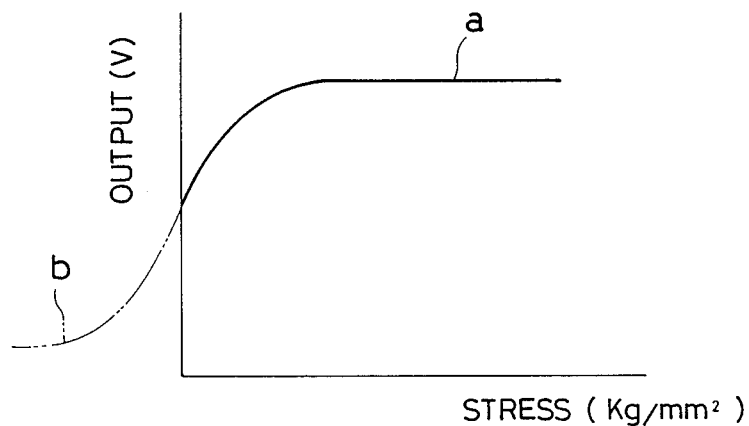
FIG. 5 and 6 are graphs showing stress-magneto characteristics for explaining the principle of the present invention.
Figure 6:
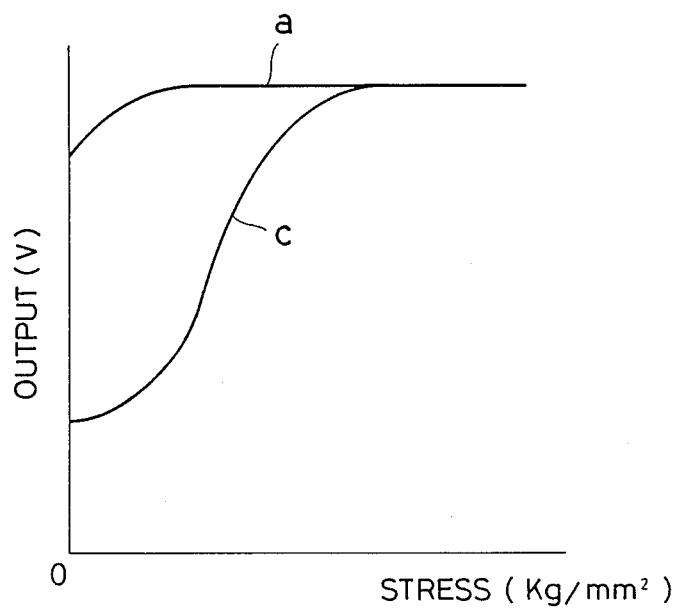

(2) On the basis of the fact that if an amount of grinding is increased a specific magnetic permeability of a thin belt is decreased, a change of characteristic curve a→characteristic curve c in FIG. 6 (note the values for stress=0) can be predicted.

Test EXAMPLE 2.

(1) The same thin belts as those used in Test Example 1 above were prepared, among which a thin belt not subjected to any treatment was named Thin Belt 1, a thin belt subjected to grinding on one surface of 0.15 μm by means of abrasive cloth or paper (#800~1000) was named Thin belt 2, and a thin belt subjected to grinding on one surface of 0.3 μm by means of abrasive cloth or paper (#800~1000) was named Thin Belt 3.

Figure 8:
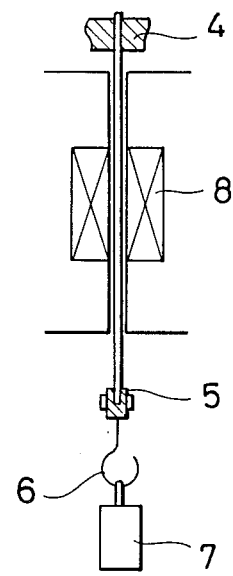
FIG. 8 is a schematic view showing a device for investigating a stress-magneto characteristic of a mechanical quantity sensor element.
Figure 9:
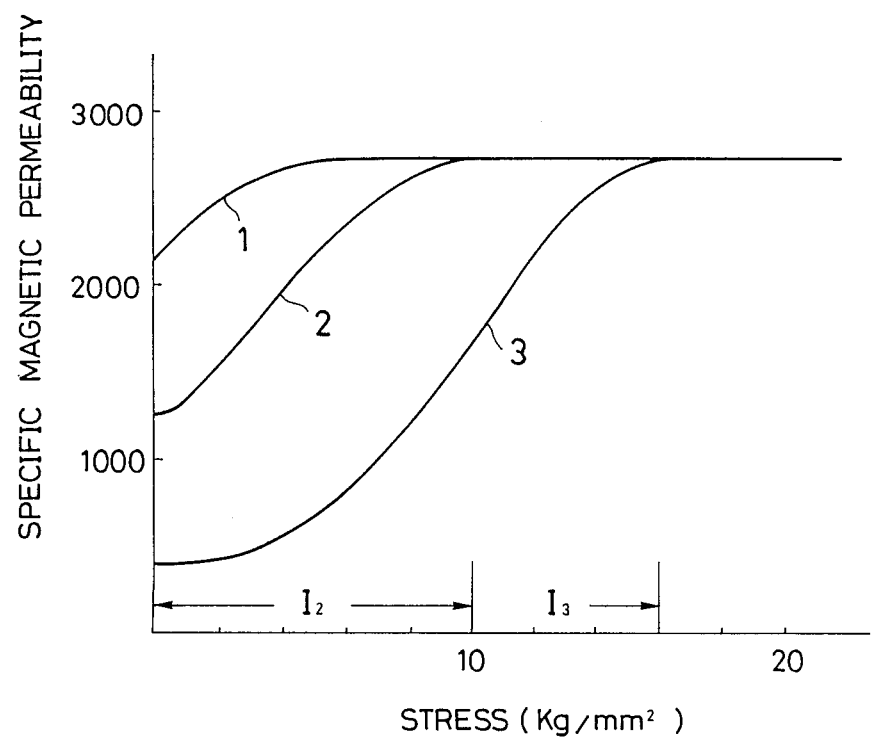
FIG. 9 is a graph showing stress-magneto characteristics of a known mechanical quantity sensor element and a mechanical quantity sensor element according to the present invention.

Thin Belts 1, 2 and 3 were used as test pieces, and their stress-magneto characteristics were checked by means of a device shown in FIG. 8. The results are shown in FIG. 9 in the form of stress vs. specific magnetic permeability curves.

In FIG. 8, reference numeral 4 designates a suspender which grips an upper edge of a test piece over its entire width, to the lower edge of the test piece is mounted a clamp 5 over its entire width, and by means of a weight 7 engaged with a hook 6 which is in turn coupled to the clamp 5, a variable tensile force is applied to the test piece.

In addition, on the opposite sides of the test piece are disposed coils 8 (80T of a formed copper wire of 0.19 mm diameter), a sinusoidal a.c. voltage of 1.1 V at 1 KHz was applied, an inductance was measured through an impedance analyzer, and a specific magnetic permeability was obtained by converting the impedance into the specific magnetic permeability.

As described previously, this specific magnetic permeability would be varied depending upon the magnitude of the tensile stress applied to Thin Belts 1, 2 and 3. Therefore, on the contrary, by measuring an induced voltage, the magnitude of a tensile force (loaded by the weight 7) can be ascertained.

The stress vs. specific magnetic permeability curves in FIG. 9 indicate changes of specific magnetic permeabilities when the loading by the weight 7 is varied with respect to Thin Belts 1, 2 and 3.

<Evaluation of the Test Result>

(1) Comparing the characteristic curve of Thin Belt 1 with the characteristic curves of Thin Belt 2 and 3, it is understood that surface grinding of a thin belt is effective. In other words, a curve having an enlarged linear range like the characteristic curve c in FIG. 6 can be obtained.

(2) Comparing the characteristic curves of Thin Belts 2 and 3 with each other, it is seen that the treatment of the larger grinding amount is more effective, and as the grinding amount is increased, that is, as an internal stress generated by the applied force is increased, the curve would shift rightwards, hence the gradient of the curve in the proximity of stress=0 would become generous, and a detectable range I for a stress would increase ($I_2 < I_3$).

As will be obvious from the above description, a mechanical quantity sensor element formed by applying an external force onto a surface of a thin belt made of noncrystalline magnetic alloy having positive magnetostriction to work the thin belt and thus preliminarily giving compression strain to at least a part of the thin belt, has been proposed.

The mechanical quantity sensor element according to the present invention has a wide scope of application, because its stress-magneto characteristic is improved and has an enlarged detectable range for a mechanical quantity as compared to a noncrystalline magnetic alloy piece (mechanical quantity sensor element) which is not preliminarily given compression strain.

In addition, in the case of the mechanical quantity sensor elements according to the present invention, "distribution" of magnetic characteristics among the respective mechanical quantity sensor elements that have been produced, can be reduced by regulating the extent of surface working.

Furthermore, in the case of the mechanical quantity sensor elements according to the present invention, since the sensor elements can be obtained through an extremely simple process such as grinding a surface of a thin belt by means of abrasive cloth or paper, the invention can contribute to reduction of a manufacturing cost of the sensor elements.

Thus, a mechanical quantity sensor element and sensing method has been disclosed. While embodiments and applications of this invention have been shown and described, it would be apparent to those skilled in the art that many more modifications are possible without departing from the described inventive concepts. Therefore, the invention is not to be restricted except in the spirit of the following claims.

What is claimed is:

1. A mechanical quantity sensor element making use of a stress-magneto effect of noncrystalline magnetic alloy having positive magnetastriction, wherein treatment is effected such that an external force is applied onto a surface of a thin belt made of noncrystalline magnetic alloy, and thereby compression strain is preliminarily given to and retained by at least a part of the thin belt.

2. A mechanical quantity sensor element as claimed in claim 1, characterized in that said treatment of applying an external force is mechanical working.

3. A mechanical quantity sensor element as claimed in claim 1, characterized in that said treatment of applying an external force is effected on the both surfaces of the thin belt.

4. A mechanical quantity sensor element as claimed in claim 2, characterized in that said mechanical working is grinding and it is effected by means of abrasive cloth or paper.

5. A method for sensing a mechanical quantity on a member by using a stress-magnetic effect of noncrystalline magnetic alloy having positive magnetostriction comprising the steps of:
   applying a preliminary compression strain onto a thin belt by applying an external force thereto and
   attaching the thin belt having the preliminary compression strain to the member.

* * * * *